US011981821B2

(12) United States Patent
Terashima et al.

(10) Patent No.: US 11,981,821 B2
(45) Date of Patent: May 14, 2024

(54) INSULATING COATING TREATMENT LIQUID, AND GRAIN-ORIENTED ELECTRICAL STEEL SHEET HAVING INSULATING COATING AND METHOD FOR PRODUCING THE SAME

(71) Applicant: JFE STEEL CORPORATION, Tokyo (JP)

(72) Inventors: Takashi Terashima, Tokyo (JP); Karin Kokufu, Tokyo (JP); Makoto Watanabe, Tokyo (JP); Toshito Takamiya, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 627 days.

(21) Appl. No.: 17/264,129

(22) PCT Filed: Jun. 19, 2019

(86) PCT No.: PCT/JP2019/024234
§ 371 (c)(1),
(2) Date: Jan. 28, 2021

(87) PCT Pub. No.: WO2020/026627
PCT Pub. Date: Feb. 6, 2020

(65) Prior Publication Data
US 2021/0317319 A1 Oct. 14, 2021

(30) Foreign Application Priority Data

Jul. 31, 2018 (JP) .................................. 2018-143673

(51) Int. Cl.
| B05D 1/28 | (2006.01) |
| B05D 3/02 | (2006.01) |
| B05D 7/14 | (2006.01) |
| C09D 1/00 | (2006.01) |
| C23C 26/00 | (2006.01) |
| H01F 1/147 | (2006.01) |

(52) U.S. Cl.
CPC ................. C09D 1/00 (2013.01); B05D 1/28 (2013.01); B05D 3/0254 (2013.01); B05D 7/14 (2013.01); C23C 26/00 (2013.01); H01F 1/147 (2013.01)

(58) Field of Classification Search
CPC .......... C09D 1/00; B05D 1/28; B05D 3/0254; B05D 7/14; C23C 26/00; C23C 22/20; C23C 22/12; C23C 22/18; C23C 22/188; C23C 22/22; C23C 22/73; C23C 22/74; C23C 22/08; H01F 1/18; H01F 1/147; C22C 38/02; C22C 38/60; C22C 38/00
See application file for complete search history.

(56) References Cited

U.S. PATENT DOCUMENTS

| 2002/0098345 A1* | 7/2002 | Kamo ..................... C23C 22/74 |
| | | 428/339 |
| 2004/0037964 A1 | 2/2004 | Davies et al. |
| 2014/0004380 A1 | 1/2014 | Holzapfel et al. |
| 2014/0245926 A1 | 9/2014 | Muraki et al. |
| 2019/0153240 A1 | 5/2019 | Kashima et al. |

FOREIGN PATENT DOCUMENTS

| CN | 103025917 A | 4/2013 |
| CN | 107429401 A | 12/2017 |
| EP | 1 074 309 A2 | 2/2001 |
| EP | 2597177 A1 | 5/2013 |
| EP | 3276043 A1 | 1/2018 |
| JP | 2000-169972 A | 6/2000 |
| JP | 2008-266743 A | 11/2008 |
| JP | 2010-053413 A | 3/2010 |
| JP | 2010053413 A * | 3/2010 |
| JP | 48-39338 B2 | 12/2011 |
| JP | 50-79442 B2 | 11/2012 |
| JP | 2017-511840 A | 4/2017 |
| JP | 2017-137540 A | 8/2017 |
| JP | 2017-141480 A | 8/2017 |
| RU | 2269555 C2 | 2/2006 |
| RU | 2550450 C2 | 5/2015 |
| WO | 2017/150383 A1 | 9/2017 |

(Continued)

OTHER PUBLICATIONS

Oct. 9, 2021 Office Action issued in Chinese Patent Application No. 201980050436.2.
Jul. 27, 2021 Extended European Search Report issued in European Patent Application No. 19844025.7.
Thomas, R. et al. "Environment Friendly Nano Silicon Dioxide Accelerated Zinc Phosphate Coating on Mild Steel Using a Series of Surfactants as Additives," Silicon, vol. 9, pp. 675-688, May 16, 2017.
Oct. 20, 2020 Office Action issued in Japanese Patent Application No. 2019-555706.
Jul. 5, 2021 Office Action issued in Russian Patent Application No. 2021101956.

(Continued)

Primary Examiner — Humera N. Sheikh
Assistant Examiner — Kevin C T Li
(74) Attorney, Agent, or Firm — Oliff PLC

(57) ABSTRACT

An insulating coating treatment liquid for forming a chromium-free insulating coating on a surface of a grain-oriented electrical steel sheet, the insulating coating treatment liquid including at least one phosphate salt selected from phosphate salts of any of Mg, Ca, Ba, Sr, Zn, Al, and Mn and including colloidal silica and particles of a metal-element-containing compound. A content of the colloidal silica in terms of $SiO_2$, on a solids basis, is 50 to 120 parts by mass, and a content of the particles of a metal-element-containing compound in terms of elemental metal is 5 to 60 parts by mass, per 100 parts by mass of the at least one phosphate salt, and the insulating coating treatment liquid has a thixotropic index (TI) of 1.00 or greater and 10.00 or less.

20 Claims, No Drawings

(56) References Cited

FOREIGN PATENT DOCUMENTS

| | | | | |
|---|---|---|---|---|
| WO | WO-2017150383 A1 * | 9/2017 | ............... | C09D 1/00 |
| WO | 2018/043167 A1 | 3/2018 | | |

OTHER PUBLICATIONS

Sep. 24, 2019 International Search Report in International Application No. PCT/JP2019/024234.
Feb. 22, 2023 Office Action issued in Korean Patent Application No. 10-2021-7002449.

* cited by examiner

INSULATING COATING TREATMENT LIQUID, AND GRAIN-ORIENTED ELECTRICAL STEEL SHEET HAVING INSULATING COATING AND METHOD FOR PRODUCING THE SAME

TECHNICAL FIELD

This application relates to an insulating coating treatment liquid for forming a chromium-free insulating coating on a surface of a grain-oriented electrical steel sheet. In addition, the application relates to a grain-oriented electrical steel sheet having an insulating coating and to a method for producing the same. The insulating coating is an insulating coating resulting from baking of the insulating coating treatment liquid and is disposed on a surface of the grain-oriented electrical steel sheet.

BACKGROUND

Typically, grain-oriented electrical steel sheets include a coating on a surface thereof. The coating is provided to impart insulating properties, stick resistance, corrosion protection properties, and the like. The surface coating includes an underlying coating and a top coating formed thereon. The underlying coating is formed during final annealing and includes forsterite as a principal constituent. The top coating is a phosphate-salt-based coating.

These coatings are formed at high temperatures and have a low coefficient of thermal expansion. Accordingly, these coatings produce the following effect: since the steel sheet and the coatings have different coefficients of thermal expansion, when their temperatures are reduced to room temperature, tension is imparted to the steel sheet, and, consequently, iron loss in the steel sheet is reduced. Accordingly, it is desired that the coatings impart as high a tension as possible to steel sheets.

To satisfy such a desire, various coatings have been proposed in the related art. For example, Patent Literature 1 proposes a coating that includes, as principal constituents, magnesium phosphate, colloidal silica, and chromic anhydride. Furthermore, Patent Literature 2 proposes a coating that includes, as principal constituents, aluminum phosphate, colloidal silica, and chromic anhydride.

On the other hand, in recent years, there has been an increasing interest in environmental protection, which has led to an increasing desire for products that do not contain toxic substances, such as chromium and lead. Hence, for grain-oriented electrical steel sheets, too, the development of a chromium-free coating (a coating containing no chromium) has been desired. However, chromium-free coatings present problems such as a significant reduction in moisture absorption resistance and a significant deficiency in the imparting of tension, and, therefore, it has been difficult to realize a chromium-free coating.

Proposals have been made for solving the problems mentioned above. Patent Literature 3 proposes a surface treatment agent that includes a dihydrogen phosphate salt, colloidal silica, and a colloidal oxide. Patent Literature 4 proposes an insulating coating treatment liquid that includes a phosphate salt, colloidal silica, and microparticles of a zirconium phosphate-based compound. Patent Literature 5 proposes a grain-oriented electrical steel sheet that includes a Ti compound, a Zr compound, and/or a Hf compound in a tension coating. Furthermore, Patent Literature 6 proposes an insulating coating that includes filler particles having a high Young's modulus.

These proposals have improved moisture absorption resistance, the iron loss reducing effect of the imparting of tension, stick resistance, and the like. However, it has been found that the following problem noticeably occurs in some cases: in high-speed roll coating in which an insulating coating treatment liquid is applied by a roll coater at an increased steel sheet feed speed, an appearance defect is exhibited after the insulating coating treatment liquid is applied and baked.

CITATION LIST

Patent Literature

PTL 1: Japanese Unexamined Patent Application Publication No. 50-79442
PTL 2: Japanese Unexamined Patent Application Publication No. 48-39338
PTL 3: Japanese Unexamined Patent Application Publication No. 2000-169972
PTL 4: Japanese Unexamined Patent Application Publication No. 2017-137540
PTL 5: Japanese Unexamined Patent Application Publication No. 2008-266743
PTL 6: Japanese Unexamined Patent Application Publication (Translation of PCT Application) No. 2017-511840

SUMMARY

Technical Problem

The disclosed embodiments have been made in view of the above circumstances, and an object of the disclosed embodiments is to provide an insulating coating treatment liquid that can form a chromium-free insulating coating having excellent moisture absorption resistance and being capable of imparting a high tension to produce an excellent iron loss reducing effect, the insulating coating treatment liquid also inhibiting appearance defects that may be exhibited after the insulating coating treatment liquid is applied to a steel sheet and baked. Another object is to provide a grain-oriented electrical steel sheet having an insulating coating and a method for producing the same; the insulating coating is an insulating coating resulting from baking of the insulating coating treatment liquid and is disposed on a surface of the grain-oriented electrical steel sheet.

Solution to Problem

To solve the problems described above, the present inventors diligently conducted research to identify a cause of the post-application-and-baking appearance defect.

Liquids containing particles (dispersions), such as that of the disclosed embodiments, have a viscosity having shear rate dependence and thus are so-called non-Newtonian fluids. That is, the viscosity is high in a low shear rate region, and the viscosity is low in a high shear rate region.

Typically, grain-oriented electrical steel sheets having an insulating coating are produced by applying an insulating coating treatment liquid to a surface of a steel sheet by using a roll coater and subsequently baking the insulating coating treatment liquid. In this instance, during the time when the insulating coating treatment liquid is applied to a surface of a steel sheet, a viscosity of the insulating coating treatment liquid at a high shear rate is important, and during the time when leveling takes place between the time of the application and the time of the baking, a viscosity of the insulating coating treatment liquid at a low shear rate is important.

If the viscosity of an insulating coating treatment liquid at a high shear rate is high, the surface of the liquid between the steel sheet and the roll becomes unstable, which increases the probability of the occurrence of a streak defect called a ribbing defect.

On the other hand, in a case where coating non-uniformities, such as a ribbing defect, resulting from the application can be corrected by leveling during the time before baking starts, appearance defects after baking can be avoided; accordingly, to promote leveling, it is important to ensure that the insulating coating treatment liquid has a low viscosity. Hence, improving leveling, in addition to correcting coating non-uniformities, is effective for ensuring a good post-application-and-baking appearance.

In any case, it is already commonly known that the viscosity of insulating coating treatment liquids needs to be sufficiently low not only at a high shear rate but also at a low shear rate.

However, in a case where the shear rate dependence of the viscosity of an insulating coating treatment liquid is high, if a deviation from proper application conditions occurs due to a speed change in a production line for an insulating coating, coating non-uniformities may be exhibited after the insulating coating treatment liquid is applied, and baking may be performed in a state in which sufficient leveling is not achieved, and, consequently, an appearance defect may be exhibited. To prevent this, it is important to ensure that the shear rate dependence of the viscosity of the insulating coating treatment liquid is not greater than a specific value. This is a finding that was made.

Specifically, a summary of the constitution of the disclosed embodiments is as follows.

[1] An insulating coating treatment liquid, which is an insulating coating treatment liquid for forming a chromium-free insulating coating on a surface of a grain-oriented electrical steel sheet, the insulating coating treatment liquid including at least one phosphate salt selected from phosphate salts of any of Mg, Ca, Ba, Sr, Zn, Al, and Mn and including colloidal silica and particles of a metal-element-containing compound, wherein a content of the colloidal silica in terms of $SiO_2$, on a solids basis, is 50 to 120 parts by mass, and a content of the particles of a metal-element-containing compound in terms of elemental metal is 5 to 60 parts by mass, per 100 parts by mass of the at least one phosphate salt, and the insulating coating treatment liquid has a thixotropic index (TI) of 1.00 or greater and 10.00 or less.

[2] The insulating coating treatment liquid according to [1], wherein the particles of a metal-element-containing compound are at least one type of particles selected from particles of an oxide and particles of a nitride, the oxide being at least one selected from oxides of any of Ti, Zr, Hf, V, Mg, Zn, and Nb, the nitride being at least one selected from nitrides of any of Ti, Zr, Hf, V, Mg, Zn, and Nb.

[3] The insulating coating treatment liquid according to [1] or [2], wherein the particles of a metal-element-containing compound are at least one type of particles selected from particles of any of $TiO_2$, $ZrO_2$, $HfO_2$, $MgO$, $ZnO$, $Nb_2O_5$, $V_2O_3$, TiN, and ZrN.

[4] The insulating coating treatment liquid according to any one of [1] to [3], wherein the particles of a metal-element-containing compound have a particle diameter of 0.05 μm or greater and 1.0 μm or less.

[5] The insulating coating treatment liquid according to any one of [1] to [4], further including a cationic surfactant.

[6] The insulating coating treatment liquid according to [5], wherein the cationic surfactant is a quaternary ammonium salt-type cationic surfactant.

[7] The insulating coating treatment liquid according to [5] or [6], wherein a content of the cationic surfactant is 0.20 to 2.0 parts by mass per 100 parts by mass of the at least one phosphate salt selected from phosphate salts of any of Mg, Ca, Ba, Sr, Zn, Al, and Mn.

[8] A grain-oriented electrical steel sheet having an insulating coating, the insulating coating being an insulating coating resulting from baking of the insulating coating treatment liquid according to any one of [1] to [7], the insulating coating being disposed on a surface of the grain-oriented electrical steel sheet.

[9] A method for producing a grain-oriented electrical steel sheet having an insulating coating, the method including applying the insulating coating treatment liquid according to any one of [1] to [7] to a surface of a grain-oriented electrical steel sheet and subsequently baking the insulating coating treatment liquid.

[10] The method for producing a grain-oriented electrical steel sheet having an insulating coating according to [9], wherein in a case where the insulating coating treatment liquid is applied to the surface of the grain-oriented electrical steel sheet, the insulating coating treatment liquid is applied to the surface of the grain-oriented electrical steel sheet by using a roll coater while the grain-oriented electrical steel sheet is moved.

Advantageous Effects

The disclosed embodiments provide an insulating coating treatment liquid that can form a chromium-free insulating coating having excellent moisture absorption resistance and being capable of imparting a high tension to produce an excellent iron loss reducing effect, the insulating coating treatment liquid also inhibiting appearance defects that may be exhibited after the insulating coating treatment liquid is applied to a steel sheet and baked.

The insulating coating treatment liquid of the disclosed embodiments inhibits appearance defects that may be exhibited after the insulating coating treatment liquid is applied and baked, even in a case where high-speed roll coating is performed or in a case where a speed change occurs in a production line for an insulating coating.

Furthermore, a grain-oriented electrical steel sheet having an insulating coating that results from the application and baking of the insulating coating treatment liquid has excellent moisture absorption resistance and an excellent iron loss reducing effect and, in addition, has a uniform and aesthetically pleasing surface appearance in which coating non-uniformity marks due to the insulating coating treatment liquid are inhibited.

DETAILED DESCRIPTION

Reasons for the disclosed ranges of each of the constitutional elements of the disclosed embodiments will be described below.

Steel sheets of concern in the disclosed embodiments may be any grade of steel provided that the steel sheets are grain-oriented electrical steel sheets. Preferably, an exemplary grain-oriented electrical steel sheet is produced by the method described below, for example.

First, a preferred chemical composition of the steel will be described. In the following description, "%" used to indicate the content of each of the elements means "mass %" unless otherwise specified.

C: 0.001 to 0.10%

C is a component useful for the formation of Goss-oriented grains. In terms of enabling such a function to be exhibited effectively, it is preferable that a C content be greater than or equal to 0.001%. On the other hand, if the C content is greater than 0.10%, poor decarburization may occur in decarburization annealing. Accordingly, it is preferable that the C content be within a range of 0.001 to 0.10%.

Si: 1.0 to 5.0%

Si is a component necessary for increasing electrical resistance to reduce iron loss and for stabilizing the BCC structure of iron to enable a high-temperature heat treatment. It is preferable that a Si content be greater than or equal to 1.0%. On the other hand, if the Si content is greater than 5.0%, it becomes difficult to perform cold rolling. Accordingly, it is preferable that the Si content be within a range of 1.0 to 5.0%. It is more preferable that the Si content be within a range of 2.0 to 5.0%.

Mn: 0.01 to 1.0%

Mn effectively contributes to remedying the hot shortness of steel and, in addition, serves as an inhibitor against the grain growth by forming a precipitate such as MnS or MnSe in a case where S or Se exists. It is, therefore, preferable that a Mn content be greater than or equal to 0.01%. On the other hand, if the Mn content is greater than 1.0%, a grain diameter of a precipitate such as MnSe may become coarsened, and, consequently, the effect of serving as an inhibitor may be lost. Accordingly, it is preferable that the Mn content be within a range of 0.01 to 1.0%.

sol. Al: 0.003 to 0.050%

Al is a useful component because, in steel, Al forms AlN, which serves as a dispersed second phase and thus functions as an inhibitor. It is, therefore, preferable that sol. Al be included in an amount greater than or equal to 0.003%. On the other hand, if an Al content, in terms of sol. Al, is greater than 0.050%, AlN may form coarse precipitates, and, consequently, the function of serving as an inhibitor may be lost. Accordingly, it is preferable that the Al content, in terms of sol. Al, be within a range of 0.003 to 0.050%.

N: 0.001 to 0.020%

Similar to Al, N is a component necessary for forming AlN. It is, therefore, preferable that a N content be greater than or equal to 0.001%. On the other hand, if the N content is greater than 0.020%, blistering or the like may occur during the heating of a slab. Accordingly, it is preferable that the N content be within a range of 0.001 to 0.020%.

Total content of one or both selected from S and Se: 0.001 to 0.05%

S and Se are useful components because S or Se binds to Mn or Cu to form MnSe, MnS, $Cu_2-xSe$, or $Cu_2-xS$, which serves as a dispersed second phase in steel and thus functions as an inhibitor. It is, therefore, preferable to ensure that a total content of one or both of S and Se be greater than or equal to 0.001%. On the other hand, if the total content of one or both of S and Se is greater than 0.05%, the solid solution thereof during the heating of a slab may be incomplete, and, in addition, a surface defect of a product may be caused. Accordingly, whether one of S and Se is included or both S and Se are included, it is preferable that the total content of S and Se be within a range of 0.001 to 0.05%.

It is preferable that the basic components of the steel be as stated above. Furthermore, in the chemical composition, the balance, other than the components described above, may be Fe and incidental impurities.

Furthermore, the chemical composition described above may further include one or more added elements selected from Cu: 0.01 to 0.2%, Ni: 0.01 to 0.5%, Cr: 0.01 to 0.5%, Sb: 0.01 to 0.1%, Sn: 0.01 to 0.5%, Mo: 0.01 to 0.5%, and Bi: 0.001 to 0.1%. Adding an element that has a function of serving as an auxiliary inhibitor enables a further improvement in magnetic properties. Among such elements are the elements mentioned above, which tend to segregate at grain diameters or a surface. Each of the elements produces a useful effect when included in an amount greater than or equal to the lower limit of the content mentioned above. If the upper limit of the content mentioned above is exceeded, a secondary recrystallization failure tends to occur, and, therefore, the ranges mentioned above are preferable.

Furthermore, in addition to the components mentioned above, one or more elements may be included, which are selected from B: 0.001 to 0.01%, Ge: 0.001 to 0.1%, As: 0.005 to 0.1%, P: 0.005 to 0.1%, Te: 0.005 to 0.1%, Nb: 0.005 to 0.1%, Ti: 0.005 to 0.1%, and V: 0.005 to 0.1%. Including one or more of these results in an enhanced ability to inhibit the grain growth, which in turn results in consistent achievement of higher magnetic flux densities.

A method for producing a grain-oriented electrical steel sheet having an insulating coating will now be described.

Molten steel having a chemical composition as described above is prepared by using a refining process known in the art, and then the molten steel is processed by using a continuous casting method or an ingot casting-slabbing rolling method to form a steel starting material (steel slab). Subsequently, the steel slab is hot-rolled to form a hot-rolled sheet, which may be subjected to hot band annealing if necessary. The resultant is then subjected to cold rolling once, or twice or more with intervening intermediate annealing, to form a cold-rolled sheet having a final sheet thickness. Next, primary recrystallization annealing and decarburization annealing are performed. Subsequently, an annealing separator containing MgO as a principal component is applied, and then final annealing is performed to form a coating layer that includes forsterite as a principal constituent. Subsequently, an insulating coating treatment liquid is applied to form a glass insulating coating, and then a drying process is performed if necessary. Subsequently, flattening annealing in which baking can also be accomplished is performed. Thus, by using such a production method including a series of the steps, a grain-oriented electrical steel sheet having an insulating coating can be produced.

An insulating coating treatment liquid of the disclosed embodiments includes at least one phosphate salt selected from phosphate salts of any of Mg, Ca, Ba, Sr, Zn, Al, and Mn and includes colloidal silica and particles of a metal-element-containing compound. A preferred solvent of the treatment liquid is water.

In the insulating coating treatment liquid, the phosphate salt to be used is at least one selected from phosphate salts of any of Mg, Ca, Ba, Sr, Zn, Al, and Mn. Phosphate salts of an alkali metal (Li, Na, or the like) are not suitable because such phosphate salts have very low moisture absorption resistance. Typically, one of the phosphate salts mentioned above is used, but two or more of the phosphate salts may be mixed together and used. In cases where two or more of the phosphate salts mentioned above are mixed together and used, the physical property values of the insulating coating (coating) can be precisely controlled. It is preferable that the phosphate salt be a dihydrogen phosphate salt (biphosphate salt) because dihydrogen phosphate salts are readily available.

The colloidal silica is included in an amount, in terms of $SiO_2$, on a solids basis, of 50 to 120 parts by mass per 100 parts by mass of the at least one phosphate salt selected from phosphate salts of any of Mg, Ca, Ba, Sr, Zn, Al, and Mn. If the content of the colloidal silica in terms of $SiO_2$ on a solids basis is less than 50 parts by mass per 100 parts by mass of the phosphate salt, the effect of reducing the coefficient of thermal expansion of the coating is reduced, and as a result, the tension that is imparted to a steel sheet is reduced, and, consequently, an iron loss remedying effect due to the formation of the insulating coating (tension coating) is not produced. Furthermore, if the content of the colloidal silica in terms of $SiO_2$ on a solids basis is greater than 120 parts by mass per 100 parts by mass of the phosphate salt, the moisture absorption resistance of the coating decreases. Preferably, the content of the colloidal silica in terms of $SiO_2$ on a solids basis is greater than or equal to 60 parts by mass per 100 parts by mass of the phosphate salt. Furthermore, preferably, the content of the colloidal silica in terms of $SiO_2$ on a solids basis is less than or equal to 100 parts by mass per 100 parts by mass of the phosphate salt.

The particles of a metal-element-containing compound are included to improve moisture absorption resistance, coating tension, corrosion resistance, and the like, which are degraded in the case of chromium-free coatings. The particles of a metal-element-containing compound are included in an amount, in terms of elemental metal, of 5 parts by mass to 60 parts by mass per 100 parts by mass of the at least one phosphate salt selected from phosphate salts of any of Mg, Ca, Ba, Sr, Zn, Al, and Mn. If the content of the particles of a metal-element-containing compound in terms of elemental metal is less than 5 parts by mass per 100 parts by mass of the phosphate salt, moisture absorption resistance, coating tension, and corrosion resistance are insufficient. On the other hand, if the content of the particles of a metal-element-containing compound in terms of elemental metal is greater than 60 parts by mass per 100 parts by mass of the phosphate salt, a viscosity of the insulating coating treatment liquid increases, and as a result, it is difficult to form a uniform coating free of appearance defects due to coating non-uniformities. Preferably, the content of the particles of a metal-element-containing compound in terms of elemental metal is greater than or equal to 10 parts by mass per 100 parts by mass of the phosphate salt. Furthermore, preferably, the content of the particles of a metal-element-containing compound in terms of elemental metal is less than or equal to 40 parts by mass per 100 parts by mass of the phosphate salt.

It is preferable that the metal element of the metal-element-containing compound be Ti, Zr, Hf, V, Mg, Zn, or Nb, from the standpoint of improving moisture absorption resistance. It is preferable that the compound be in the form of an oxide or a nitride.

It is preferable that the particles of a metal-element-containing compound be at least one type of particles selected from particles of any of $TiO_2$, $ZrO_2$, $HfO_2$, MgO, ZnO, $Nb_2O_5$, $V_2O_3$, TiN, and ZrN. Using any of these particles facilitates enhancement of coating tension and corrosion resistance.

In the insulating coating treatment liquid of the disclosed embodiments, the metal-element-containing compound is present in the form of particles (microparticles). It is preferable that a particle diameter of the particles of a metal-element-containing compound be 0.05 μm or greater and 1.0 μm or less, from the standpoint of improving coating tension. More preferably, the particle diameter of the particles of a metal-element-containing compound is greater than or equal to 0.10 μm. Furthermore, more preferably, the particle diameter of the particles of a metal-element-containing compound is less than or equal to 0.80 μm. The particle diameter is an average particle diameter of the particles (secondary particles (aggregated particles) in a case where the particles are aggregated) in the insulating coating treatment liquid and is the value measured by laser diffractometry. The average particle diameter is a volume-based 50% particle diameter, that is, the median diameter (d50).

The insulating coating treatment liquid of the disclosed embodiments has a thixotropic index (TI) of 1.00 or greater and 10.00 or less.

The thixotropic index (TI) is a value calculated as follows. By performing a measurement using a single cylinder rotational viscometer, which is a so-called B-type viscometer, as specified in JIS Z 8803, a viscosity η (L) [mPa·s], which is a viscosity at a liquid temperature of 20° C. and a rotational speed of 6 rpm, and a viscosity η (H) [mPa·s], which is a viscosity at a liquid temperature of 20° C. and a rotational speed of 60 rpm, are obtained. Accordingly, a calculation is performed using equation (1) below. It is preferable that the spindle to be used not be changed between the measurement at 6 rpm and the measurement at 60 rpm.

$$TI=\eta(L)/\eta(H) \quad (1)$$

The TI value of 1.00 indicates that the insulating coating treatment liquid is a Newtonian fluid, which has a viscosity independent of shear rates. If TI is less than 1.00, the viscosity increases when the shear rate is increased, and a ribbing defect is very likely to occur. Accordingly, TI's of less than 1.00 are unsuitable. On the other hand, if TI is greater than 10.00, the rate of increase in viscosity increases excessively when the shear rate is reduced, and, therefore, leveling cannot be sufficiently achieved; consequently, the post-application-and-baking surface is not uniform. This tendency is prominent in a case where high-speed roll coating is performed and in a case where a speed change occurs in a production line for an insulating coating. Preferably, TI is 1.00 or greater and 8.00 or less. More preferably, TI is greater than or equal to 1.20. Furthermore, more preferably, TI is less than or equal to 6.00.

Note that η (L) is not particularly limited and is preferably 2.0 to 60.0 mPa·s. Furthermore, η (H) is not particularly limited and is preferably 2.0 to 30.0 mPa·s.

Methods for controlling the thixotropic index (TI) to be within a preferred range include various methods, examples of which include a method in which the pH of the insulating coating treatment liquid is changed and a method in which a surface charge of the colloidal silica is controlled by surface treatment. Examples of the method in which the pH of the insulating coating treatment liquid is changed include a method in which an inorganic acid or the like is added to the insulating coating treatment liquid. In particular, a method in which small amounts of a dispersant is added to the insulating coating treatment liquid to control TI is preferable because this method has the least influence on the properties of the insulating coating.

There are various types of dispersants, such as ionic surfactants and nonionic surfactants. In the disclosed embodiments, it is preferable to add a cationic surfactant. A reason for this is as follows. It is believed that in the insulating coating treatment liquid, a surface of the particles of a metal-element-containing compound is negatively charged, and a cationic surfactant can be easily adsorbed onto the surface. Among cationic surfactants, quaternary ammonium salt-type surfactants, which have low foamability, are most preferable for use in the insulating coating treatment liquid of the disclosed embodiments. While a content of the dispersant depends on the ratio of mixing of constituents, the content is preferably 0.20 parts by mass or greater and 2.0 parts by mass or less per 100 parts by mass of the at least one phosphate salt selected from phosphate salts of any of Mg, Ca, Ba, Sr, Zn, Al, and Mn. More preferably, the content of the dispersant is greater than or equal to 0.25 parts by mass per 100 parts by mass of the phosphate salt. Furthermore, more preferably, the content of the dispersant is less than or equal to 1.5 parts by mass per 100 parts by mass of the phosphate salt. Note that in a case where the dispersant is diluted in a solvent, the amount of the dispersant expressed in parts by mass does not include the amount of the solvent.

According to the disclosed embodiments, methods for producing a grain-oriented electrical steel sheet having an insulating coating include a production method in which the insulating coating treatment liquid is applied to a surface of a grain-oriented electrical steel sheet, drying is then performed if necessary, and thereafter, baking is performed. In a case where the insulating coating treatment liquid is applied to a surface of a grain-oriented electrical steel sheet, it is preferable that the insulating coating treatment liquid be applied to the surface of the grain-oriented electrical steel sheet by using a roll coater while the grain-oriented electrical steel sheet is moved. With the disclosed embodiments, appearance defects that may be exhibited after the insulating coating treatment liquid is applied and baked are inhibited, even in a case where high-speed roll coating is performed or in a case where a speed change occurs in a production line for an insulating coating. Examples of the production conditions associated with the high-speed roll coating include a production condition in which a feed speed for the steel sheet during the application of the insulating coating treatment liquid to the surface of the grain-oriented electrical steel sheet is 180 mpm (meter per minute) or greater. Furthermore, examples of the production conditions associated with the speed change include a production condition in which a difference of 50 mpm or greater is caused between the maximum steel sheet feed speed and the minimum steel sheet feed speed in a production line in which the insulating coating treatment liquid is applied to the surface of the grain-oriented electrical steel sheet.

According to the disclosed embodiments, a grain-oriented electrical steel sheet having an insulating coating includes an insulating coating on both surfaces. The insulating coating is a coating formed by applying the insulating coating treatment liquid to the surfaces of a steel sheet, then performing drying if necessary, and thereafter performing baking. Since the grain-oriented electrical steel sheet having an insulating coating of the disclosed embodiments includes the insulating coating, the grain-oriented electrical steel sheet has excellent moisture absorption resistance and an excellent iron loss reducing effect and also has a uniform and aesthetically pleasing surface appearance in which irregularities due to coating non-uniformities associated with the insulating coating treatment liquid are inhibited.

It is preferable that the grain-oriented electrical steel sheet having an insulating coating of the disclosed embodiments have an iron loss of less than or equal to 0.88 W/kg. Furthermore, in the grain-oriented electrical steel sheet having an insulating coating of the disclosed embodiments, it is preferable that the tension (coating tension) imparted by the insulating coating to the grain-oriented electrical steel sheet be greater than or equal to 10.0 MPa. Furthermore, it is preferable that the grain-oriented electrical steel sheet having an insulating coating of the disclosed embodiments have a moisture absorption resistance corresponding to an amount of leaching of phosphorus of less than or equal to 100 [μg/150 cm$^2$]. Note that the methods for measuring the iron loss, tension imparted, and moisture absorption resistance are as described below in EXAMPLES.

EXAMPLES

Example 1

A final-annealed grain-oriented electrical steel sheet having a sheet thickness of 0.20 mm was prepared. The grain-oriented electrical steel sheet had a magnetic flux density $B_8$ of 1.920 T. The grain-oriented electrical steel sheet was pickled in phosphoric acid, and subsequently, various chromium-free insulating coating treatment liquids, shown in Table 1, were each applied such that a total coating weight for both surfaces after baking of 8.0 g/m$^2$ was achieved. In this instance, the insulating coating treatment liquid was applied by using a roll coater while the grain-oriented electrical steel sheet was moved, with two levels of feed speeds, 120 mpm and 240 mpm, being used. Subsequently, a baking process was performed under the conditions of 820° C., 30 seconds, and a 100 vol % $N_2$ atmosphere. Accordingly, grain-oriented electrical steel sheets having an insulating coating were produced.

In Table 1, the phosphate salt used for each of the samples was an aqueous solution of a dihydrogen phosphate salt, and the colloidal silica used was SNOWTEX-C, manufactured by Nissan Chemical Corporation. For both of these, the contents shown are on a solids basis. The particles of a metal-element-containing compound used were particles of $TiO_2$, $ZrO_2$, $HfO_2$, $Nb_2O_5$, $V_2O_3$, MgO, or ZnO. In all instances, a particle diameter was within a range of 0.1 to 0.8 μm. The particle diameter of the metal-element-containing compound in the insulating coating treatment liquid was measured by using a laser diffraction particle size distribution analyzer SALD-3100, manufactured by Shimadzu Corporation. The particle diameter is an average particle diameter and is a volume-based 50% particle diameter, that is, the median diameter. Furthermore, the contents of the particles of a metal-element-containing compound shown are contents in terms of elemental metal, on a solids basis. The surfactant used as a dispersant was QUARTAMIN 24P (a quaternary ammonium salt-type cationic surfactant), manufactured by Kao Corporation. The content of the surfactant shown does not include the amount of the solvent. A specific gravity of the insulating coating treatment liquid was adjusted to 1.180 by using purified water.

By using the methods described below, a measurement of viscosities of the insulating coating treatment liquid, an evaluation of the appearance of a surface exhibited after the insulating coating treatment liquid was applied and baked, and evaluations of iron loss, tension imparted, and moisture absorption resistance of the grain-oriented electrical steel sheet having an insulating coating were performed. The results are shown in Table 1.

(Viscosity of Insulating Coating Treatment Liquid)

Viscosities of the coating treatment liquid were measured by using a B-type viscometer with a No. 1 rotor, manufactured by Toki Sangyo Co., Ltd. Specifically, the viscosity η (L) at a liquid temperature of 20° C. and a rotational speed of 6 rpm and the viscosity η (H) at a liquid temperature of 20° C. and a rotational speed of 60 rpm were measured. Subsequently, the thixotropic index (TI) was calculated according to equation (1) below.

$$TI = \eta(L)/\eta(H) \quad (1)$$

(Surface Appearance Exhibited After Insulating Coating Treatment Liquid was Applied and Baked)

A visual examination was performed to check the states of the surface, onto which the insulating coating treatment liquid had been applied by using a roll coater while the grain-oriented electrical steel sheet was moved, with two levels of feed speeds, 120 mpm and 240 mpm, being used, followed by baking. Evaluations were made as follows. In the following evaluations, the symbol "O" indicates "pass". No ribbing defect occurred under either of the conditions (120 mpm and 240 mpm): O A ribbing defect occurred under one of the conditions: $\Delta_{120}$ or $\Delta_{240}$ ($\Delta_{120}$ indicates that a ribbing defect occurred under the condition of 120 mpm, and $\Delta_{240}$ indicates that a ribbing defect occurred under the condition of 240 mpm)

A ribbing defect occurred under both of the conditions: x (Iron Loss)

In accordance with the method specified in JIS C 2550, an iron loss ($W_{17/50}$) was measured by using a test piece of 30 mm (width)×280 mm (length) cut from the grain-oriented electrical steel sheet having an insulating coating. When the iron loss ($W_{17/50}$) was 0.88 W/kg or less, a rating of "pass" was given.

(Tension Imparted)

The tension (coating tension) imparted to the steel sheet was determined as follows. The tension was a tension in a rolling direction. A test piece of 30 mm (length in a direction perpendicular to the rolling direction)×280 mm (length in the rolling direction) was cut from the grain-oriented electrical steel sheet having an insulating coating. One surface of the test piece was masked with adhesive tape, and then the insulating coating on the other surface was removed by using alkali, acid, or the like. Next, a region extending 30 mm at one end of the test piece was fixed, and a portion of the test piece extending 250 mm therefrom was designated as a measurement length. Accordingly, a magnitude of deflection was measured, and the equation shown below was used. Note that the Young's modulus of the steel sheet was assumed to be 132 GPa. When the tension imparted was 10.0 MPa or greater, a rating of "pass" was given. Tension (MPa) imparted to steel sheet=Young's modulus (GPa) of steel sheet×sheet thickness (mm)×magnitude of deflection (mm)÷(deflection measurement length (mm))$^2$×10$^3$ (Moisture Absorption Resistance)

A moisture absorption resistance was measured and evaluated as follows. Three test pieces of 50 mm×50 mm, which were cut from the grain-oriented electrical steel sheet having an insulating coating, were immersed and boiled in distilled water at 100° C. for 5 minutes to leach phosphorus from the surface of the insulating coating. The amount of leaching [μg/150 cm$^2$] was quantitatively analyzed by inductively coupled plasma spectrometry. When the amount of leaching of phosphorus was 100 or less [μg/150 cm$^2$], a rating of "pass" was given.

Table 1 indicates that the use of an insulating coating treatment liquid of the disclosed embodiments enables the formation of a chromium-free insulating coating having excellent moisture absorption resistance and being capable of imparting a high tension to produce an excellent iron loss reducing effect and also inhibits appearance defects due to coating non-uniformities that may occur in a case where the insulating coating treatment liquid is applied to a steel sheet.

TABLE 1

| No. | Phosphate salt (parts by mass) (solids basis) | | | | | | | Colloidal silica (parts by mass) (solids basis) | Metal-element-containing compound | | surfactant Amount added (parts by mass) | Viscosity of treatment liquid (mPa·s) | | | Surface appearance | Tension imparted (MPa) | $W_{17/50}$ (W/kg) | Phosphorus leaching amount (μg/150 cm²) | Notes |
|---|---|---|---|---|---|---|---|---|---|---|---|---|---|---|---|---|---|---|---|
| | Mg phosphate | Ca phosphate | Ba phosphate | Sr phosphate | Zn phosphate | Al phosphate | Mn phosphate | | Type | Amount added (parts by mass) | | η(L) | η(H) | TI | | | | | |
| 1 | 100 | — | — | — | — | — | — | 80 | TiO₂ | 2 | — | 36.2 | 4.1 | 8.83 | ○ | 6.3 | 0.90 | 400 | Comparative example |
| 2 | 100 | — | — | — | — | — | — | 80 | TiO₂ | 5 | — | 63.5 | 5.9 | 10.76 | Δ₁₂₀ | 10.6 | 0.78 | 98 | Comparative example |
| 3 | 100 | — | — | — | — | — | — | 80 | TiO₂ | 5 | 0.50 | 34.6 | 5.6 | 6.18 | ○ | 11.0 | 0.76 | 97 | Example |
| 4 | 100 | — | — | — | — | — | — | 80 | TiO₂ | 10 | 0.50 | 38.0 | 11.8 | 3.22 | ○ | 11.5 | 0.75 | 38 | Example |
| 5 | 100 | — | — | — | — | — | — | 80 | ZrO₂ | 30 | 0.50 | 55.7 | 23.6 | 2.36 | ○ | 12.0 | 0.74 | 32 | Example |
| 6 | 70 | — | — | — | — | 30 | — | 80 | ZrO₂ | 40 | 0.50 | 63.4 | 28.4 | 2.23 | ○ | 12.3 | 0.73 | 28 | Example |
| 7 | 30 | — | — | — | — | 70 | — | 80 | Nb₂O₅ | 60 | 0.50 | 68.4 | 30.3 | 2.26 | ○ | 12.4 | 0.74 | 28 | Example |
| 8 | — | — | — | — | — | 100 | — | 50 | Nb₂O₅ | 70 | 1.5 | 76.9 | 45.6 | 1.69 | × | 12.0 | 0.74 | 42 | Comparative example |
| 9 | — | — | — | — | — | 100 | — | 50 | HfO₂ | 10 | 0.20 | 37.4 | 10.4 | 3.60 | ○ | 11.5 | 0.74 | 39 | Example |
| 10 | — | — | — | — | — | 100 | — | 80 | HfO₂ | 40 | 0.25 | 68.9 | 23.9 | 2.88 | ○ | 12.5 | 0.87 | 32 | Example |
| 11 | — | — | — | — | — | 100 | — | 100 | V₂O₅ | 5 | 1.0 | 24.6 | 5.3 | 4.64 | ○ | 10.8 | 0.78 | 90 | Example |
| 12 | — | — | — | — | — | 100 | — | 120 | ZrO₂ | 10 | 1.0 | 36.1 | 12.7 | 2.84 | ○ | 11.6 | 0.77 | 35 | Example |
| 13 | — | — | — | — | — | 100 | — | 150 | V₂O₅ | 40 | 1.5 | 50.7 | 15.8 | 3.21 | ○ | 12.8 | 0.83 | 145 | Comparative example |
| 14 | — | 100 | — | — | — | — | — | 100 | MgO | 10 | 1.8 | 24.6 | 12.6 | 1.95 | ○ | 11.4 | 0.74 | 37 | Example |
| 15 | — | — | 100 | — | — | — | — | 100 | MgO | 40 | 2.0 | 38.6 | 29.2 | 1.32 | ○ | 12.3 | 0.75 | 26 | Example |
| 16 | — | — | — | 100 | — | — | — | 100 | ZnO | 10 | 1.0 | 26.4 | 12.0 | 2.20 | ○ | 11.3 | 0.74 | 39 | Example |
| 17 | — | — | — | — | 100 | — | — | 100 | ZnO | 40 | 2.0 | 32.1 | 29.3 | 1.10 | ○ | 12.6 | 0.74 | 27 | Example |
| 18 | — | — | — | — | — | 100 | — | 100 | ZnO | 60 | 2.0 | 35.6 | 33.6 | 1.06 | ○ | 12.6 | 0.75 | 24 | Example |
| 19 | — | — | — | — | — | — | 100 | 100 | V₂O₅ | 10 | 2.0 | 8.9 | 8.9 | 1.00 | ○ | 11.6 | 0.74 | 38 | Example |
| 20 | 70 | — | — | — | — | — | 30 | 80 | ZrO₂ | 5 | 0.80 | 32.1 | 6.2 | 5.18 | ○ | 10.9 | 0.79 | 35 | Example |
| 21 | 80 | 20 | — | — | — | — | — | 80 | ZrO₂ | 20 | 0.80 | 45.6 | 16.7 | 2.73 | ○ | 11.9 | 0.78 | 37 | Example |
| 22 | 50 | — | — | — | 50 | — | — | 80 | ZrO₂ | 20 | 0.25 | 60.3 | 18.3 | 3.30 | ○ | 11.9 | 0.79 | 36 | Example |
| 23 | 50 | — | — | 50 | — | — | — | 100 | ZrO₂ | 20 | 0.25 | 58.6 | 17.5 | 3.35 | ○ | 11.8 | 0.77 | 39 | Example |
| 24 | — | — | 50 | — | — | 50 | — | 100 | ZrO₂ | 20 | 1.5 | 40.6 | 13.6 | 2.99 | ○ | 11.9 | 0.78 | 34 | Example |
| 25 | 60 | — | — | — | — | 40 | — | 100 | HfO₂ | 20 | 1.5 | 36.9 | 12.4 | 2.98 | ○ | 11.8 | 0.77 | 34 | Example |
| 26 | 30 | — | — | — | — | 70 | — | 100 | V₂O₅ | 1 | — | 2.2 | 2.3 | 0.96 | Δ₂₄₀ | 7.6 | 0.90 | 350 | Comparative example |

The underline indicates the value is outside the range of the disclosed embodiments.

Example 2

A final-annealed grain-oriented electrical steel sheet having a sheet thickness of 0.27 mm was prepared. The grain-oriented electrical steel sheet had a magnetic flux density $B_8$ of 1.928 T. The grain-oriented electrical steel sheet was pickled in phosphoric acid, and subsequently, various chromium-free insulating coating treatment liquids, shown in Table 2, were each applied such that a total coating weight for both surfaces after baking of 12.0 g/m² was achieved. In this instance, the insulating coating treatment liquid was applied by using a roll coater while the grain-oriented electrical steel sheet was moved, with two levels of feed speeds, 100 mpm and 300 mpm, being used. Subsequently, a baking process was performed under the conditions of 900° C., 30 seconds, and a 90 vol % $N_2$ and 10 vol % $H_2$ atmosphere. Accordingly, grain-oriented electrical steel sheets having an insulating coating were produced.

In Table 2, the phosphate salt used for each of the samples was an aqueous solution of a dihydrogen phosphate salt, and the colloidal silica used was AT-30, manufactured by ADEKA Corporation. For both of these, the contents shown are on a solids basis. The particles of a metal-element-containing compound used were NanoUse ZR-30AH, which is a $ZrO_2$ sol manufactured by Nissan Chemical Corporation. The amount of addition, in terms of elemental metal (Zr), on a solids basis, was 20 parts by mass per 100 parts by mass of the phosphate salt. A particle diameter was 0.1 μm (measured as in Example 1). The surfactants used as a dispersant were SN dispersant 4215 (a quaternary ammonium salt-type cationic surfactant), manufactured by San Nopco Limited., and ACETAMIN 24 (alkylamine-type cationic surfactant), manufactured by Kao Corporation. The amounts of addition of the surfactants shown do not include the amount of the solvent. A specific gravity of the insulating coating treatment liquid was adjusted to 1.250 by using purified water.

As in Example 1, a measurement of a viscosity of the insulating coating treatment liquid and evaluations of iron loss, tension imparted, and moisture absorption resistance of the grain-oriented electrical steel sheet having an insulating coating were performed. Furthermore, an evaluation of the appearance of the surface exhibited after the insulating coating treatment liquid was applied and baked was performed by using the method described below. The results are shown in Table 2.

(Surface Appearance Exhibited After Insulating Coating Treatment Liquid was Applied and Baked)

A visual examination was performed to check the states of the surface, onto which the insulating coating treatment liquid had been applied by using a roll coater while the grain-oriented electrical steel sheet was moved, with two levels of feed speeds, 100 mpm and 300 mpm, being used, followed by baking. Evaluations were made as follows. In the following evaluations, the symbol "O" indicates "pass".

No ribbing defect occurred under either of the conditions (100 mpm and 300 mpm): O A ribbing defect occurred under one of the conditions: $\Delta_{100}$ or $\Delta_{300}$ ($\Delta_{100}$ indicates that a ribbing defect occurred under the condition of 100 mpm, and $\Delta_{300}$ indicates that a ribbing defect occurred under the condition of 300 mpm)

A ribbing defect occurred under both of the conditions: x

Table 2 indicates that the use of an insulating coating treatment liquid of the disclosed embodiments enables the formation of a chromium-free insulating coating having excellent moisture absorption resistance and being capable of imparting a high tension to produce an excellent iron loss reducing effect and also inhibits appearance defects due to coating non-uniformities that may occur in a case where the insulating coating treatment liquid is applied to a steel sheet.

TABLE 2

| No. | Phosphate salt (parts by mass) (solids basis) Mg phosphate | Phosphate salt (parts by mass) (solids basis) Al phosphate | Colloidal silica (parts by mass) (solids basis) | Surfactant Type | Surfactant Amount added (parts by mass) | Viscosity of treatment liquid η (L) (mPa·s) | Viscosity of treatment liquid η (H) (mPa·s) | TI | Surface appearance | Tension imparted (MPa) | $w_{17/50}$ (W/kg) | Phosphorus leaching amount (μg/150 cm²) | Notes |
|---|---|---|---|---|---|---|---|---|---|---|---|---|---|
| 1 | 100 | — | <u>40</u> | SN4215 | 0.20 | 53.4 | 16.4 | 3.26 | O | 7.3 | 1.00 | 35 | Comparative example |
| 2 | 100 | — | 50 | SN4215 | 0.25 | 42.6 | 15.8 | 2.70 | O | 12.0 | 0.86 | 32 | Example |
| 3 | 100 | — | 80 | SN4215 | 0.50 | 30.6 | 14.1 | 2.17 | O | 11.8 | 0.87 | 30 | Example |
| 4 | 100 | — | 100 | Acetamin 24 | 0.25 | 47.9 | 16.4 | 2.92 | O | 11.7 | 0.88 | 26 | Example |
| 5 | 100 | — | 120 | Acetamin 24 | 1.50 | 27.4 | 13.4 | 2.04 | O | 11.6 | 0.88 | 37 | Example |
| 6 | 100 | — | 150 | Acetamin 24 | 2.00 | 24.1 | 12.7 | 1.90 | O | 10.8 | 0.90 | 190 | Comparative example |
| 7 | 70 | 30 | 40 | Acetamin 24 | 0.20 | 67.9 | 18.4 | 3.69 | O | 7.2 | 0.97 | 36 | Comparative example |
| 8 | 50 | 50 | 50 | Acetamin 24 | 0.20 | 68.3 | 18.6 | 3.67 | O | 12.0 | 0.87 | 37 | Example |
| 9 | 30 | 70 | 100 | SN4215 | 1.00 | 37.4 | 10.4 | 3.60 | O | 10.9 | 0.88 | 39 | Example |
| 10 | — | 100 | 120 | SN4215 | 1.50 | 25.4 | 12.2 | 2.08 | O | 11.1 | 0.88 | 34 | Example |
| 11 | — | 100 | <u>150</u> | SN4215 | 2.00 | 23.4 | 11.8 | 1.98 | O | 10.6 | 0.92 | 220 | Comparative example |

The underline indicates the value is outside the range of the disclosed embodiments.

Example 3

A final-annealed grain-oriented electrical steel sheet having a sheet thickness of 0.23 mm was prepared. The grain-oriented electrical steel sheet had a magnetic flux density $B_8$ of 1.923 T. The grain-oriented electrical steel sheet was pickled in phosphoric acid, and subsequently, various chromium-free insulating coating treatment liquids, shown in Table 3, were each applied such that a total coating weight for both surfaces after baking of 10.0 g/m² was achieved. In this instance, the insulating coating treatment liquid was applied by using a roll coater while the grain-oriented electrical steel sheet was moved, with two levels of feed speeds, 150 mpm and 380 mpm, being used. Subsequently, a baking process was performed under the conditions of 950° C., 10 seconds, and an 85 vol % $N_2$ and 15 vol % $H_2$ atmosphere. Accordingly, grain-oriented electrical steel sheets having an insulating coating were produced.

In Table 3, the phosphate salt used was an aqueous solution of aluminum dihydrogen phosphate, and the colloidal silica used was AT-30, manufactured by ADEKA Corporation. For both of these, the contents shown are on a solids basis. The particles of a metal-element-containing compound used were particles of $TiO_2$, ZrN, $HfO_2$, or MgO. The amounts of addition shown are in terms of elemental metal, on a solids basis. A particle diameter of these in the insulating coating treatment liquid was measured as in Example 1. To control the viscosity properties of the insulating coating treatment liquid, the inorganic acids listed in Table 3 were each added in an amount shown in the table. The amounts of addition shown are amounts that do not include the amount of the substances other than the inorganic acid, such as a solvent. A specific gravity of the insulating coating treatment liquid was adjusted to 1.100 by using purified water.

As in Example 1, a measurement of a viscosity of the insulating coating treatment liquid and evaluations of iron loss, tension imparted, and moisture absorption resistance of the grain-oriented electrical steel sheet having an insulating coating were performed. Furthermore, an evaluation of the appearance of the surface exhibited after the insulating coating treatment liquid was applied and baked was performed by using the method described below. The results are shown in Table 3.

(Surface Appearance Exhibited After Insulating Coating Treatment Liquid was Applied and Baked)

A visual examination was performed to check the states of the surface, onto which the insulating coating treatment liquid had been applied by using a roll coater while the grain-oriented electrical steel sheet was moved, with two levels of feed speeds, 150 mpm and 380 mpm, being used, followed by baking. Evaluations were made as follows. In the following evaluations, the symbol "O" indicates "pass".

No ribbing defect occurred under either of the conditions (150 mpm and 380 mpm): O A ribbing defect occurred under one of the conditions: $\Delta_{150}$ or $\Delta_{380}$ ($\Delta_{150}$ indicates that a ribbing defect occurred under the condition of 150 mpm, and $\Delta_{380}$ indicates that a ribbing defect occurred under the condition of 380 mpm)

A ribbing defect occurred under both of the conditions: x

Table 3 indicates that the use of an insulating coating treatment liquid of the disclosed embodiments enables the formation of a chromium-free insulating coating having excellent moisture absorption resistance and being capable of imparting a high tension to produce an excellent iron loss reducing effect and also inhibits appearance defects due to coating non-uniformities that may occur in a case where the insulating coating treatment liquid is applied to a steel sheet.

TABLE 3

| No. | Al phosphate (parts by mass) (solids basis) | Colloidal silica (parts by mass) (solids basis) | Metal-element-containing compound Type | Amount added (parts by mass) | Particle diameter (d50) (μm) | Inorganic acid Type | Amount added (parts by mass) | Viscosity of treatment liquid (mPa·s) η (L) | η (H) | TI | Surface appearance | Tension imparted (MPa) | $W_{17/50}$ (W/kg) | Phosphorus leaching amount (μg/150 cm²) | Notes |
|---|---|---|---|---|---|---|---|---|---|---|---|---|---|---|---|
| 1 | 100 | 100 | $TiO_2$ | 10 | 0.10 | — | — | 113.0 | 8.9 | <u>12.70</u> | x | 10.6 | 0.82 | 38 | Comparative example |
| 2 | 100 | 100 | $TiO_2$ | 10 | 0.50 | $HNO_3$ | 1.00 | 36.4 | 10.5 | 3.47 | O | 12.6 | 0.77 | 36 | Example |
| 3 | 100 | 50 | $TiO_2$ | 10 | 0.50 | $H_2SO_4$ | 1.00 | 34.6 | 12.4 | 2.79 | O | 11.9 | 0.78 | 34 | Example |
| 4 | 100 | 100 | $HfO_2$ | 10 | 0.50 | HCl | 1.00 | 37.6 | 11.6 | 3.24 | O | 12.3 | 0.78 | 33 | Example |
| 5 | 100 | 80 | $HfO_2$ MgO | 5 15 | 1.00 | $HNO_3$ | 0.80 | 68.9 | 22.9 | 3.01 | O | 12.2 | 0.79 | 24 | Example |
| 6 | 100 | 120 | ZrN MgO | 25 15 | 0.80 | $H_2SO_4$ | 2.00 | 73.9 | 33.1 | 2.23 | O | 11.8 | 0.78 | 26 | Example |
| 7 | 100 | 90 | $HfO_2$ $TiO_2$ | 5 10 | 0.60 | HCl | 1.50 | 20.6 | 10.6 | 1.94 | O | 12.8 | 0.76 | 22 | Example |
| 8 | 100 | 60 | TiO2 MgO | 5 2 | 0.70 | HCl | 0.50 | 11.2 | 11.2 | 1.00 | O | 11.6 | 0.80 | 64 | Example |
| 9 | 100 | 100 | $TiO_2$ $ZrO_2$ | 15 25 | 1.00 | $HNO_3$ | 2.00 | 36.7 | 26.4 | 1.39 | O | 13.0 | 0.76 | 16 | Example |

The underline indicates the value is outside the range of the disclosed embodiments.

The invention claimed is:

1. An insulating coating treatment liquid for forming a chromium-free insulating coating on a surface of a grain-oriented electrical steel sheet, the insulating coating treatment liquid comprising:

at least one phosphate salt selected from the group consisting of phosphate salts of any of Mg, Ca, Ba, Sr, Zn, Al, and Mn;

colloidal silica; and particles of a metal-element-containing compound, wherein a content of the colloidal silica in terms of $SiO_2$, on a solids basis, is in a range of 50 to 120 parts by mass, a content of the particles of the metal-element-containing compound in terms of elemental metal is in a range of 5 to 60 parts by mass, per 100 parts by mass of the at least one phosphate salt, and the insulating coating treatment liquid has a thixotropic index (TI) in a range of 1.00 or greater and 10.00 or less.

2. The insulating coating treatment liquid according to claim 1, wherein the particles of the metal-element-containing compound comprise at least one type of particle selected from the group consisting of particles of an oxide and particles of a nitride, the oxide being at least one selected from the group consisting of oxides of any of Ti, Zr, Hf, V, Mg, Zn, and Nb, and the nitride being at least one selected from the group consisting of nitrides of any of Ti, Zr, Hf, V, Mg, Zn, and Nb.

3. The insulating coating treatment liquid according to claim 1, wherein the particles o the metal-element-containing compound comprise at least one type of particle selected from the group consisting of particles of any of $TiO_2$, $ZrO_2$, $HfO_2$, MgO, ZnO, $Nb_2O_5$, $V_2O_5$, TiN, and ZrN.

4. The insulating coating treatment liquid according to claim 1, wherein the particles of the metal-element-containing compound have a particle diameter in a range of 0.05 μm or greater and 1.0 μm or less.

5. The insulating coating treatment liquid according to claim 1, further comprising a cationic surfactant.

6. The insulating coating treatment liquid according to claim 5, wherein the cationic surfactant is a quaternary ammonium salt.

7. The insulating coating treatment liquid according to claim 5, wherein a content of the cationic surfactant is in a range of 0.20 to 2.0 parts by mass per 100 parts by mass of the at least one phosphate salt.

8. A grain-oriented electrical steel sheet having an insulating coating resulting from baking of the insulating coating treatment liquid according to claim 1, the insulating coating being disposed on a surface of the grain-oriented electrical steel sheet.

9. A method for producing a grain-oriented electrical steel sheet having an insulating coating, the method comprising applying the insulating coating treatment liquid according to claim 1 to a surface of a grain-oriented electrical steel sheet and subsequently baking the insulating coating treatment liquid.

10. The method for producing a grain-oriented electrical steel sheet having an insulating coating according to claim 9, wherein the insulating coating treatment liquid is applied to the surface of the grain-oriented electrical steel sheet by using a roll coater while the grain-oriented electrical steel sheet is moved.

11. The insulating coating treatment liquid according to claim 2, wherein the particles of the metal-element-containing compound have a particle diameter in a range of 0.05 μm or greater and 1.0 μm or less.

12. The insulating coating treatment liquid according to claim 2, further comprising a cationic surfactant.

13. The insulating coating treatment liquid according to claim 4, further comprising a cationic surfactant.

14. The insulating coating treatment liquid according to claim 11, further comprising a cationic surfactant.

15. The insulating coating treatment liquid according to claim 12, wherein the cationic surfactant is a quaternary ammonium salt.

16. The insulating coating treatment liquid according to claim 13, wherein the cationic surfactant is a quaternary ammonium salt.

17. The insulating coating treatment liquid according to claim 14, wherein the cationic surfactant is a quaternary ammonium salt.

18. The insulating coating treatment liquid according to claim 12, wherein a content of the cationic surfactant is in a range of 0.20 to 2.0 parts by mass per 100 parts by mass of the at least one phosphate salt.

19. The insulating coating treatment liquid according to claim 13, wherein a content of the cationic surfactant is in a range of 0.20 to 2.0 parts by mass per 100 parts by mass of the at least one phosphate salt.

20. The insulating coating treatment liquid according to claim 14, wherein a content of the cationic surfactant is in a range of 0.20 to 2.0 parts by mass per 100 parts by mass of the at least one phosphate salt.

* * * * *